(12) United States Patent
Sugiyama et al.

(10) Patent No.: US 7,432,016 B2
(45) Date of Patent: Oct. 7, 2008

(54) ELECTRODE FOR NON-AQUEOUS SECONDARY BATTERY AND NON-AQUEOUS SECONDARY BATTERY USING THE SAME

(75) Inventors: Hiromu Sugiyama, Ibaraki (JP); Kiyomi Ishizawa, Ibaraki (JP); Atsushi Ueda, Ibaraki (JP); Shigeo Aoyama, Ibaraki (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 178 days.

(21) Appl. No.: 10/940,049

(22) Filed: Sep. 14, 2004

(65) Prior Publication Data

US 2005/0058906 A1    Mar. 17, 2005

(30) Foreign Application Priority Data

Sep. 17, 2003    (JP) .............................. 2003-324206

(51) Int. Cl.
*H01M 4/58* (2006.01)
*H01M 4/66* (2006.01)
*H01M 4/80* (2006.01)

(52) U.S. Cl. ............... 429/231.95; 429/245; 429/218.1; 429/233

(58) Field of Classification Search ............ 429/231.95, 429/245, 218.1, 233
See application file for complete search history.

(56) References Cited

U.S. PATENT DOCUMENTS

| 7,160,646 B2* | 1/2007 | Ohshita et al. | 429/218.1 |
| 7,258,950 B2* | 8/2007 | Tamura et al. | 429/233 |
| 2002/0177044 A1 | 11/2002 | Yagi | |
| 2003/0180619 A1* | 9/2003 | Tamura et al. | 429/231.95 |
| 2005/0074671 A1* | 4/2005 | Sugiyama et al. | 429/231.95 |

FOREIGN PATENT DOCUMENTS

| EP | 1 246 278 A1 | 10/2002 |
| JP | 2001-068094 | 3/2001 |
| JP | 2001-256968 * | 9/2001 |
| JP | 2002-279974 | 9/2002 |
| WO | WO-02/25757 | 3/2002 |

OTHER PUBLICATIONS

Noriyuki Tamura, et al., "Study On the Anode Behavior of Sn and Sn-Cu Alloy Thin Film Electrodes", Journal of Power Sources, 107 (2002), pp. 48-55.
Patent Abstracts of Japan for JP2001-068094.
Patent Abstracts of Japan for JP2001-256968.
Patent Abstracts of Japan for JP2002-279974.

* cited by examiner

*Primary Examiner*—Patrick Ryan
*Assistant Examiner*—Angela Martin
(74) *Attorney, Agent, or Firm*—Birch, Stewart, Kolasch & Birch, LLP

(57) ABSTRACT

An alloy material containing an intermetallic compound of metal that is alloyed with Li and metal that is not alloyed with Li, capable of repeatedly absorbing and desorbing Li, is formed on a collector made of a material that is not alloyed with Li, as a plurality of convex portions partitioned with gaps disposed thereamong, and an area the convex portions occupy on the collector is assumed to be 60 to 95% of the area of the collector. Because of this, an electrode containing an intermetallic compound capable of repeatedly absorbing and desorbing Li can be provided, which can configure a non-aqueous secondary battery having a higher charging/discharging efficiency, a larger discharging capacity, and more excellent high rate characteristics and cycle characteristics.

20 Claims, 2 Drawing Sheets

ELECTRODE FOR NON-AQUEOUS SECONDARY BATTERY AND NON-AQUEOUS SECONDARY BATTERY USING THE SAME

BACKGROUND OF THE INVENTION

1. Field of the Invention

The present invention relates to an electrode for a non-aqueous secondary battery in which an alloy containing metal that is alloyed with Li is formed on a collector as a plurality of convex portions with gaps disposed thereamong, and a non-aqueous secondary battery using the electrode as a negative electrode.

2. Description of the Related Art

Conventionally, as a negative electrode for a non-aqueous secondary battery such as a lithium secondary battery, a graphite-based electrode containing a graphite-based material as a negative active material has been used. Recently, in order to increase a capacity, in place of the graphite-based electrode, a so-called thin film electrode is proposed, in which a thin film made of metal such as Si, Ge, Sn, or the like that is alloyed with Li or an alloy of the metals is formed on a collector made of a material that is not alloyed with Li, and such a thin film electrode is receiving attention (see JP2001-68094A and JP2001-256968A).

Among these prior art references, JP2001-68094A discloses that a Sn thin film is formed on a copper plate that is a collector by electroplating, and JP2001-256968A discloses that a thin film made of Sn, Zn, Sb, or an alloy containing them is formed on a copper foil by electroplating.

Among the above-mentioned metals, in particular, Sn has a higher energy density (994 mAh/g) compared with a conventional graphite-based negative material, so that Sn is considered as a promising next-generation negative material. However, in an actual electrode, when Li is absorbed electrochemically up to x=4.4 in a composition formula: $Li_xSn$, the volume of a thin film constituting an active material expands by 3 to 4 times. Such a volume expansion leads to a decrease in cycle characteristics of a non-aqueous secondary battery, and Sn has a catalytic function, so that it will decompose an electrolyte solution.

In order to solve the above-mentioned problem, an electrode having an intermetallic compound of Sn is proposed (see J. Power Source, 107(2002), pp. 48-55)

In this document, a Sn thin film is formed on a collector made of a Cu foil by electroplating, and heat-treated at a temperature in the vicinity of the melting point of Sn, whereby a Sn-based metal thin film with a gradient structure in which each element interdiffuses at a Cu—Sn interface is obtained. $Cu_6Sn_5$ formed in this case is capable of repeatedly absorbing/desorbing Li, is less changed in volume compared with Sn, and has no catalytic function. Thus, $Cu_6Sn_5$ is expected as a negative material that can solve the problem peculiar to the Sn thin film.

Furthermore, as a result of the Cu—Sn interdiffusion involved in heat treatment, the collector and the $Cu_6Sn_5$ alloy thin film as the active material layer are integrated more closely. Therefore, even when the expansion/contraction of the active material involved in a charging/discharging cycle occur, the active material is unlikely to drop from the collector, and cycle characteristics are enhanced compared with the case of using Sn alone.

However, due to that fact that the Sn thin film obtained by electroplating is fine and continuous, and that the density of the Sn thin film is further increased by the subsequent heat treatment, as the thickness of the active material layer is increased, the electrode including the collector is influenced by the volume expansion of the active material layer involved in absorption/desorption of Li. Consequently, the generation of cracks in the active material layer, the excess expansion of the electrode, the wrinkling of the collector, and the like are exhibited remarkably, and a capacity and cycle characteristics are decreased.

SUMMARY OF THE INVENTION

The present invention provides an electrode for a non-aqueous secondary battery including an alloy containing metal that is alloyed with Li and metal that is not alloyed with Li on a collector made of a material that is not alloyed with Li, wherein the alloy is formed on the collector as a plurality of convex portions partitioned with gaps disposed thereamong, and contains an intermetallic compound of the metal that is alloyed with Li and the metal that is not alloyed with Li, capable of repeatedly absorbing and desorbing Li, and an area the convex portions occupy on the collector is 60 to 95% of an area of the collector.

Furthermore, the present invention provides a non-aqueous secondary battery including a positive electrode, a negative electrode composed of the above-mentioned electrode for a non-aqueous secondary battery, and a non-aqueous electrolyte.

These and other advantages of the present invention will become apparent to those skilled in the art upon reading and understanding the following detailed description with reference to the accompanying figures.

DESCRIPTION OF THE PREFERRED EMBODIMENTS

Figure 1:
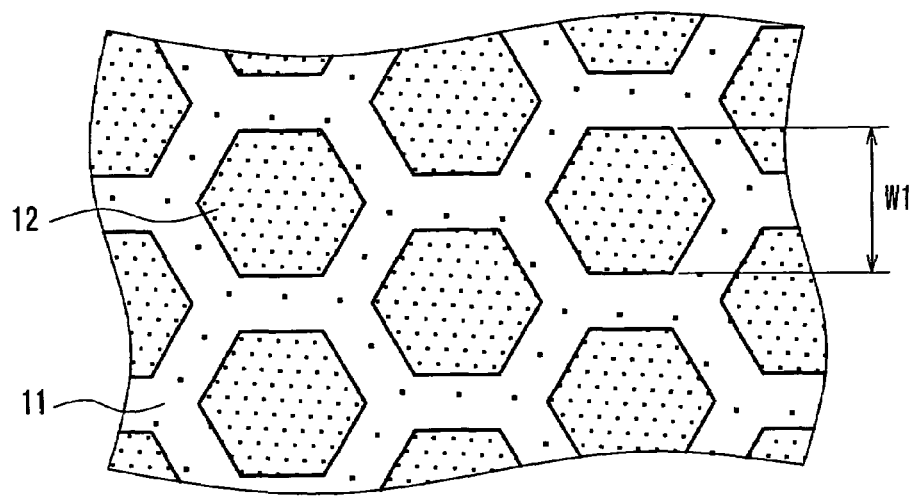
FIG. 1 is a conceptual view showing an exemplary planar shape of convex portions in an electrode of the present invention.

The inventors of the present invention earnestly studied in order to solve the above-mentioned problems. Consequently, we found that, by forming an active material layer composed of an alloy thin film or the like containing the above-mentioned intermetallic compound such as $Cu_6Sn_5$ as a plurality of convex portions partitioned with gaps disposed thereamong, a change in volume of the active material layer involved in absorption/desorption of Li can be separated on the convex portion basis, whereby the expansion of an electrode, the wrinkling of a collector, and the generation of cracks in the active material layer can be minimized, thereby achieving the present invention.

The electrode having an active material layer formed in a convex shape of the present invention has the following features, compared with a conventional electrode having an active material layer made of a continuous and uniform alloy thin film.

(1) The active material layer of the electrode formed as a plurality of convex portions is partitioned with gaps disposed thereamong. Therefore, the stress against the active material layer caused during a charging/discharging cycle is alleviated, and the expansion of an electrode and the wrinkling of a collector can be reduced, whereby cycle characteristics are enhanced.

(2) The effective area of the active material layer is increased, so that the reactivity of the electrode is improved, and the charging/discharging efficiency and high rate characteristic are enhanced.

(3) Due to the presence of the gaps among the convex portions, the electrode becomes flexible and is suitable as an electrode body with a winding configuration.

In the electrode of the present invention, an active material layer composed of an alloy containing metal that is alloyed with Li and metal that is not alloyed with Li is formed on a collector made of a material that is not alloyed with Li. However, as the material constituting the collector, for example, metal such as Cu, Ni, Fe, a Cu alloy, stainless steel, etc., a layered body of the metals such as a Cu foil having a Ni covering layer, or the like can be used.

Examples of the metal that is alloyed with Li include Sn, Si, Ge, Sb, In, Al, Pb, and the like. Two or more kinds of the metals may be combined.

Examples of the metal that is not alloyed with Li include Cu, Ni, Fe, Mn, Co, Cr, Mo, W, Ti, Zr, and the like. Two or more kinds of the metals may be combined.

Hereinafter, an electrode having an active material layer formed in a convex shape of the present invention, and the reason why the electrode has the above-mentioned effects will be described, exemplifying Sn as the metal that is alloyed with Li, and Cu as the metal that is not alloyed with Li.

First, the electrode of the present invention will be described. There is no particular limit to the method for producing the electrode of the present invention. For example, the electrode of the present invention can be produced as follows.

In order to provide a collector made of Cu with a portion where a Sn-plated layer is not formed, a non-conductive portion is previously formed of a non-conductive material, and then, a Sn-plated layer is formed by electroplating in the portion where the non-conductive portion was not formed on the collector. Thereafter, the non-conductive portion is removed, whereby only the Sn-plated layer in a convex shape remains on the Cu collector. When the Cu collector having the Sn-plated layer is heat-treated at a temperature in the vicinity of the melting point of Sn, each element interdiffuses at a Cu—Sn interface, and a plurality of convex portions of the active material layer made of a Cu—Sn alloy (i.e., an alloy of Cu that is not alloyed with Li and Sn that is alloyed with Li) such as $Cu_6Sn_5$ are formed on the collector with gaps disposed thereamong, whereby an electrode for a non-aqueous secondary battery of the present invention is obtained.

In the conventional electrode having a fine and uniform active material layer, the volume expansion in a direction parallel to a collector is suppressed. Therefore, the volume expansion in a direction vertical to the collector (i.e., in a thickness direction of the electrode) is increased, and consequently, a battery expands largely. In addition, the collector is wrinkled to degrade cycle characteristics. However, in the electrode of the present invention, a plurality of convex portions (active material layer) are partitioned from each other with gaps disposed thereamong. Therefore, when a non-aqueous secondary battery using the electrode of the present invention as a negative electrode is charged/discharged, the active material layer can expand in volume in a direction parallel to the collector as well as in a direction vertical to the collector. Therefore, the internal stress involved in charging/discharging is alleviated, whereby the above-mentioned problem can be suppressed. Furthermore, due to the presence of gaps among the respective convex portions, the flexibility of the electrode is enhanced, and hence, the electrode becomes suitable for constituting the electrode body with a winding configuration. Furthermore, absorption/desorption of Li can be performed even on a side surface of the convex portion. Therefore, the effective area of the electrode is increased, and the charging/discharging efficiency and rate characteristics of the battery also can be enhanced.

FIG. 1 shows an example of a planar shape of a convex portion in the electrode of the present invention. As shown in FIG. 1, an active material layer 12 is formed on a collector 11 as a plurality of convex portions in a hexagonal shape. The collector 11 is exposed in gaps of the active material layer 12. When Li is absorbed in the active material layer 12 due to charging, each hexagonal shape expands so as to exactly fill the gaps. At this time, although the active material layer 12 expands also in a direction vertical to the drawing surface (i.e., in a thickness direction of the electrode), the degree of expansion is smaller than that of the above-mentioned conventional electrode having a fine and uniform active material layer, and hence, a change in thickness of the battery is suppressed. When Li is desorbed due to discharging, each hexagonal shape contracts in volume so as to return to an original shape.

As described above, for forming the above-mentioned active material layer, for example, a method for previously forming a non-conductive portion of a non-conductive material on a collector, and partially forming a plated layer can be used. An example of such a method for forming a non-conductive portion includes forming a pattern made of a non-conductive material having water resistance and high chemical resistance on a collector. As the method for forming a pattern, for example, screen printing, ink-jet printing, type printing, or the like can be adopted. Among them, a method for forming a non-conductive portion with ink containing a non-conductive material such as pigment ink and oil ink by ink-jet printing is used preferably.

It is preferable that the non-conductive material contained in the above-mentioned ink is excellent in water resistance and chemical resistance. The reason for this is as follows. In plating after forming an ink pattern on the collector, a plating bath for plating is an acid or alkaline solution. Therefore, in order to maintain the above-mentioned pattern shape, water resistance and chemical resistance are required to some degree. Examples of such a non-conductive material include phenol resin, alkyd resin, and the like, and it is preferable to select them appropriately in accordance with the kind of a plating solution and processing step.

In screen printing, as long as a pattern to be formed on the collector maintains an intended shape, there is no particular limit to the method for forming the pattern. As the material used for forming a pattern, those which have excellent water resistance and chemical resistance are preferable in the same way as in the above-mentioned ink. Examples of such a material include UV-curable resin, a negative/positive photoresist, and the like.

It is preferable that the non-conductive material (insulating material) constituting the above-mentioned non-conductive portion is excellent in adhesion with respect to a collector, and is likely to be dissolved in a solvent and the like. When the adhesion of the non-conductive material with respect to the collector is weak, plating grows in a wedge shape on a contact interface between the collector and the pattern to allow the pattern to peel off, which makes it impossible to form intended plating in a convex shape. Examples of such a material include a mixture of phenol resin and alkyd resin, a material with a trace amount of adhesive such as nitrocellulose added thereto, and the like.

In the electrode of the present invention, the area of the convex portions forming the active material layer occupying on the collector needs to be 60 to 95% of the area of the collector. In the case where the ratio of the area is less than 60%, the amount of the active material per unit area is decreased, and the advantage in terms of the battery capacity is reduced compared with the existing graphite-based material. Furthermore, in the case where the ratio is larger than 95%, the alleviation of the stress involved in a change in volume during absorption/desorption of Li becomes insufficient, whereby the effect of suppressing the expansion of the electrode and the wrinkling of the collector is decreased. In particular, it is desirable that the ratio is 80% or more in terms of the electrode capacity, and the ratio is 90% or less in terms of the above-mentioned effects.

Figure 2:
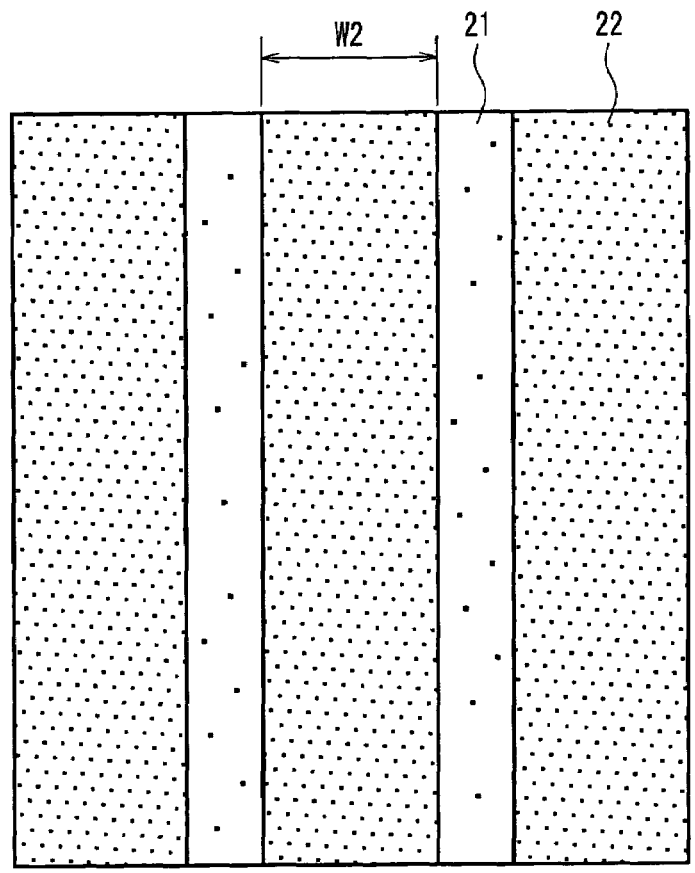
FIG. 2 is a conceptual view showing another exemplary planar shape of the convex portions in the electrode of the present invention.

In the electrode of the present invention, the convex-shaped active material layer can have various planar shapes. For example, the active material layer has a planar shape of a hexagon as shown in FIG. 1. Alternatively, the active material layer has another polygonal shape such as a triangle, a rectangle, or the like, or has a circular shape. Furthermore, as shown in FIG. 2, an active material layer 22 may be formed in a stripe shape on a collector 21. Furthermore, in the case where the convex portions having a planar shape are seen stereoscopically, the shape of the convex portions can have, for example, a cylinder, a cone, a truncated cone, a prismatic shape such as a triangular prism, a quadratic prism, a hexagonal cylinder, a pyramid, a truncated pyramid, or shapes similar thereto.

Furthermore, for forming the active material layer, the following also may be possible. After a uniform plated layer is formed, only a portion desired to be left is masked, and the plated layer in a portion that is not masked is removed with a plating stripping agent or the like.

According to the present invention, the collector is composed of a material that is not alloyed with Li. Examples of the material that is not alloyed with Li include Cu, Ni, a Cu alloy, and the like, as described above. In particular, Cu and a Cu alloy are used preferably due to the electrochemical stability, a low production cost, and the like. The thickness of the collector desirably is in a range of 8 to 50 µm. More specifically, when the thickness of the collector is too small, the strength of the electrode is decreased. When the thickness of the collector is too large, the volume ratio of the active material is decreased, leading to a decrease in a battery capacity. The thickness of the collector is desirably 10 µm or more in terms of the strength of the electrode, and more desirably 30 µm or less in terms of the battery capacity.

As the collector, any material that is not substantially alloyed with Li can be used. For example, an electrolytic foil, a rolled foil, a mesh, an embossed metal foil, a metal porous body having unevenness such as a foamed metal foil, and the like can be used irrespective of a production method and a shape. Among them, the porous body having unevenness has a large specific area, so that it can be used preferably in the case where an increase in capacity and charging/discharging at a high rate are required.

In the collector, a plated layer containing metal that is alloyed with Li is formed by electroplating. As the electrolysis condition, in order to enhance the purity of the metal that is alloyed with Li, a plated layer preferably is formed at a lowest possible speed. Specifically, it is desirable that electroplating is performed at a current value of 10 A/dm² or less. Furthermore, the thickness of the plated layer formed by electroplating preferably is 3 to 15 µm.

As the metal that is alloyed with Li, Sn is particularly preferable. The plated layer obtained by plating may be formed of not only the above-mentioned metal that is alloyed with Li, but also an alloy containing metal that is alloyed with Li, such as a Sn alloy containing at least one kind of metal selected from the group consisting of Bi, Cu, Fe, Ni, Zn, Ag, Zr, Pb, In, and Sb, in addition to Sn.

The heat treatment is performed in a temperature range not exceeding the melting point of the metal that is alloyed with Li (in the case of Sn, at a temperature not exceeding 231.9° C. that is the melting point of Sn), in a vacuum atmosphere or a reducing atmosphere. The reason for this is as follows. If the heat treatment is performed at the melting point or higher, Sn in the plated layer is eluted before forming an alloy with Cu of the collector. It is preferable that actual heat treatment is performed at 220° C. or lower. The heat treatment time needs to be set sufficiently long so that Sn and Cu in the plated layer interdiffuse, and the heat treatment preferably is performed for 5 hours or longer, in particular, 12 hours or longer. On the other hand, even when the heat treatment time is too long, the productivity is decreased, so that it is performed preferably within 24 hours. In the case of using metal other than Sn as the metal that is alloyed with Li, heat treatment may be performed at a temperature not exceeding the melting point in the vicinity of the melting point of the metal. The heat treatment time also may be appropriately adjusted based on the above range.

For forming a plated layer of metal that is alloyed with Li or an alloy thereof on a collector by electroplating, a plated layer may be formed as a single layer. Alternatively, for example, a multi-plated layer in which at least one Sn-plated layer and at least one Cu-plated layer are layered alternately, followed by heat treatment, whereby an alloy active material layer containing an intermetallic compound of metal that is alloyed with Li such as Sn, and metal that is not alloyed with Li such as Cu can formed. Furthermore, instead of directly forming the above-mentioned Sn-plated layer or multi-plated layer on the collector, after a Ni layer is formed, the above-mentioned plated layer is formed, followed by heat treatment, whereby Cu in the collector is consumed during formation of a Cu—Sn alloy, and the collector can be suppressed from being degraded. Thus, for the protective layer of the collector, materials such as Ti, Zr, W, Ag, Zn, and the like can be used in addition to Ni.

The multi-plated layer can be produced, for example, as follows. Plated layers of metal that is alloyed with Li or an alloy thereof, and plated layers that are capable of forming an intermetallic compound with the metal that is alloyed with Li and that does not substantially react with Li are layered alternately on a collector that does not substantially react with Li, whereby a layered body is formed. In this case, at least one each plated layer is formed. Furthermore, by setting the thickness of each plated layer to be 10 µm or less, the reaction of alloying proceeds satisfactorily during heat treatment. Therefore, the ratio of forming an intended intermetallic compound capable of absorbing and desorbing Li repeatedly can be enhanced. Furthermore, as the thickness is smaller, the heat treatment temperature can be set to be lower. Therefore, the thickness of the plated layer is desirably 5 µm or less, and more desirably 3 µm or less.

On the other hand, when the thickness of the plated layer is set to be too small, a production process becomes complicated. Therefore, the thickness of the plated layer is desirably 0.5 µm or more, and more desirably 1 µm or more in terms of a practical use. In the case where the above-mentioned intermetallic compound is allowed to contain a substituent element for the purpose of enhancing the reactivity during heat treatment, enhancing the cycle characteristics of the electrode, and the like, it is desirable that either one of the above-mentioned plated layers is allowed to contain the substituent element. Alternatively, the following also may be possible. A plated layer of a substituent element is formed separately from the above-mentioned plated layers, and all the plated layers are compounded during heat treatment. There is no particular limit to the substituent element. In the case where the intermetallic compound is $Cu_6Sn_5$, for example, at least one element selected from the group consisting of Bi, Fe, Ni, Zn, Ag, Zr, Pb, In, and Sb can be used as the substituent element. The ratio of the substituent element may be in a range that will not impair the characteristics of the intermetallic compound to be a base. Usually, the ratio of the substituent element contained in an alloy may be set be about 10% by mass.

According to the present invention, there is no particular limit to the intermetallic compound constituting the active material of the electrode, as long as it reacts electrochemically with Li, and performs the reaction of absorption/desorption of Li repeatedly. Examples of the intermetallic compound include $Cu_6Sn_5$, $Sb_3Co$, SbNiMn, $Sn_7Ni_3$, $Mg_2Sn$, and the like. In particular, a NiAs-type intermetallic compound belonging to a space group $P6_3/mmc$ such as $Cu_6Sn_5$ is used preferably due to its excellent reversibility, large capacity, and excellent cycle characteristics.

According to the present invention, in terms of the efficiency of charging/discharging and cycle characteristics, it is preferable that the ratio of the intermetallic compound contained in the alloy of metal that is alloyed with Li and metal that is not alloyed with Li is higher. For example, in X-ray diffraction measurement of the alloy with a $CuK\alpha$ line, assuming that the intensities of the strongest peaks of diffraction lines derived from the intermetallic compound and the metal that is alloyed with Li are $I_a$ and $I_b$, respectively, the intensity ratio $I_b/I_a$ is desirably 0.1 or less, more desirably 0.05 or less.

Furthermore, it is preferable that the ratio of an unintended intermetallic compound, such as $Cu_3Sn$, that cannot be charged/discharged reversibly is smaller. Assuming that the intensity of the strongest peak of the diffraction line derived from $Cu_3Sn$ is $I_c$ in the X-ray diffraction measurement of the alloy with a $CuK\alpha$ line, the intensity ratio $I_c/I_a$ is desirably 0.1 or less, and more desirably 0.05 or less.

Next, the non-aqueous secondary battery of the present invention will be described. The non-aqueous secondary battery of the present invention includes a positive electrode, a negative electrode composed of the electrode for a non-aqueous secondary battery of the present invention described above, and a non-aqueous electrolyte.

The positive electrode can have the following configuration. Examples of a positive active material include lithium-containing metal oxides such as a lithium cobalt oxide (e.g., $LiCoO_2$), a lithium manganese oxide (e.g., $LiMn_2O_4$), a lithium nickel oxide (e.g., $LiNiO_2$), $LiNi_xCo_{(1-x)}O_2$ in which a part of Ni of $LiNiO_2$ is replaced with Co, $LiMn_{(1-x)/2}Ni_{(1-x)/2}CO_xO_2$ containing Mn and Ni in equal proportions, and an olivine-type $LiMPO_4$ (M: Co, Ni, Mn, Fe, etc.), and the like; metal sulfides such as titanium disulfide and molybdenum disulfide; vanadium pentoxide; chromium oxide; and the like. The positive electrode can be produced, for example, by coating a collector material such as an aluminum foil with a mixture obtained by appropriately adding a carbon-based conductive assistant, a binder such as polyvinylidene fluoride, or the like to the positive active material, followed by molding. However, the method for producing the positive electrode is not limited to the above-mentioned exemplary method.

As the non-aqueous electrolyte, an electrolyte solution, a gel electrolyte, a polymer electrolyte, an inorganic solid electrolyte such as LIPON, ambient temperature molten salt containing Li ions, and the like can be used. In particular, an electrolyte solution is used often. The electrolyte solution is prepared by dissolving a solute such as a lithium salt in a solvent. For preparing the electrolyte solution, examples of the solvent include 1,2-dimethoxyethane, 1,2-diethoxyethane, propylene carbonate, ethylene carbonate, vinylene carbonate, γ-butyrolactone, tetrahydrofuran, 1,3-dioxolane, diethyl carbonate, dimethyl carbonate, methyl ethyl carbonate, and the like can be used. These solvents may be used alone or in combination of two or more kinds. Furthermore, if required, other components may be added. Examples of the solute to be dissolved in the above-mentioned solvent include $LiClO_4$, $LiPF_6$, $LiBF_4$, $LiAsF_6$, $LiSbF_6$, $LiCF_3SO_3$, $LiC_4F_9SO_3$, $LiCF_3CO_2$, $Li_2C_2F_4(SO_3)_2$, $LiN(CF_3SO_2)_2$, $LiN(CF_3SO_2)_2$, $LiC_nF_{2n+1}SO_3$ ($n \geq 2$), $LiN(RfOSO_2)_2$ (where Rf is a fluoroalkyl group), $LiN(CF_3SO_2)(C_4F_9SO_2)$, $LiN(C_2F_5SO_2)(C_2F_5SO_2)$, and the like. These solutes may be used alone or in combination of two or more kinds.

In the case of using a separator, those which have sufficient strength and can hold a great amount of the above-mentioned electrolyte solution are preferable. In this respect, a microporous film made of polypropylene, polyethylene, or a copolymer of propylene and ethylene, non-woven fabric, or the like, having a thickness of 10 to 50 μm and an opening ratio of 30 to 70%, preferably is used.

Hereinafter, the present invention will be described specifically by way of examples. These examples are described merely for illustrative purposes, and the present invention is not limited to these examples. In the following examples, "%" representing the concentration and composition of a solution and the like refer to "% by mass", unless the standard is specified otherwise.

EXAMPLE 1

An electrolytic copper foil (produced by Furukawa Circuit Foil Co., Ltd.) (thickness: 10 μm) was cut to a size of 3 cm×5 cm. The cut electrolytic copper foil was soaked for 4 minutes in a 10% sulfuric acid aqueous solution heated to 40° C., in order to remove an oxide coating film, oils and fats, and dust on the surface. Thereafter, the electrolytic copper foil was placed in a bath of a degreasing solution heated to 60° C., containing 5 g/dm³ of sodium hydroxide, 20 g/dm³ of sodium orthosilicate, 10 g/dm³ of anhydrous sodium carbonate, and 1 g/dm³ of n-dodecyltrimethylammonium chloride, whereby electrolytic cathode degreasing was performed for one minute at a current density of 5 A/dm².

After the copper foil was washed with distilled water, the surface of the copper foil was printed with pigment ink containing a cyan dye including, as a solvent, 47.5 parts by mass of propylene glycol monomethyl ether acetate, 47.5 parts by mass of propylene glycol dimethyl ether, and 5 parts by mass of N-methyl-2-pyrolidone by ink-jet printing, so that a hexagonal pattern remains as a non-printed portion as shown in FIG. 1. Thereafter, the copper foil was soaked in a 10% sulfuric acid aqueous solution again to neutralize alkali on the surface of the copper foil and remove a surfactant. Thus, a copper foil collector for electroplating was obtained, in which a non-conductive portion without a plated layer was formed.

The copper foil was soaked in a Sn plating bath containing 40 g/dm³ of stannous sulfate, 60 g/dm³ of sulfuric acid, 40 g/dm³ of cresol sulfonic acid, 2 g/dm³ of gelatin, and 1 g/dm³ of β-naphthol. Then, the copper foil was subjected to electroplating at a current density of 1 A/cm² for 150 minutes while stirring with a stirrer, whereby a Sn-plated layer with a thickness of 5 μm was formed by electroplating. The copper foil with a number of hexagonal Sn-plated layers formed thereon was washed with N-methyl-2-pyrolidone to remove the pigment ink constituting the non-conductive portion. After being washed with water, the copper foil was heat-treated in a vacuum electric furnace at 200° C. for 17 hours to allow Sn to be alloyed with Cu of the collector, whereby $Cu_6Sn_5$ was formed. After the heat treatment, the resultant copper foil was cooled gradually to room temperature, and dried with a vacuum drier at 60° C. for 15 hours. Thereafter, the copper foil was transferred to a dry box in an argon atmosphere, and punched to a circle (diameter: 16 mm) to produce an electrode for a non-aqueous secondary battery. When the surface of the electrode was observed with an electron microscope, the area the active material layer occupy on the collector was 80%. Furthermore, the size of the active material layer of the present example corresponding to a size w1 of the active material layer 12 in FIG. 1 was about 500 μm.

EXAMPLE 2

After the electrolytic copper foil was washed in the same way as in Example 1, the entire surface of the copper foil was subjected to electroplating of Sn in the same way as in Example 1, whereby a Sn-plated layer with a thickness of 5 μm was formed. Next, 80% of the surface of the Sn-plated layer was covered with a masking tape produced by Nitto Denko Corporation, using a pattern shown in FIG. 2. The resultant copper foil was soaked for 5 minutes in a plating stripping agent "Melstrip HN-8 4 4" (Trade Name; produced by Meltex Inc.) heated to 45° C. to strip Sn-plating in a non-covered portion. Furthermore, the copper foil was heat-treated in the same way as in Example 1, followed by drying. Thereafter, the copper foil was punched to a circle (diameter: 16 mm), whereby an electrode for a non-aqueous secondary battery was produced. When the surface of the electrode was observed with an electron microscope, the area the active material layer occupy on the collector was 80%. Furthermore, the size of the active material layer of the present example corresponding to a size w2 of the active material layer 22 in FIG. 2 was about 1 mm.

EXAMPLE 3

An electrode for a non-aqueous secondary battery having a pattern of the active material layer shown in FIG. 1 was produced in the same way as in Example 1, except that the surface of an electrolytic copper foil was coated with a positive photoresist, and the copper foil after being exposed to light was subjected to electroplating. When the surface of the electrode was observed with an electron microscope, the area the active material layer occupy on the collector was 65%. Furthermore, the size of the active material layer of the present example corresponding to the size w1 of the active material layer 12 in FIG. 1 was about 300 μm.

EXAMPLE 4

The same copper foil with a non-conductive portion formed thereon as that of Example 1 was subjected to electroplating for 150 seconds at a current density of 1 A/dm$^2$ in a Zn plating bath containing 10 g/cm$^3$ of zinc, 12 g/dm$^3$ of sodium cyanide, and 80 g/dm$^3$ of sodium hydroxide, whereby a Zn-plated layer with a thickness of about 0.5 μm was formed. Then, the copper foil was washed with water, and subjected to electroplating for 15 minutes at a current density of 1 A/cm$^3$ in a Cu plating bath containing 100 g/dm$^3$ of copper sulfate and 100 g/dm$^3$ of sulfuric acid, whereby a Cu-plated layer with a thickness of about 3 μm was formed on the Zn-plated layer. A Zn-plated layer of 0.5 μm further was formed again on the resultant Cu-plated layer under the above-mentioned condition, followed by washing with water, and a Sn-plated layer with a thickness of 5 μm was formed on the Zn-plated layer under the same condition as that of Example 1. The configuration of the obtained multi-plated layer was Sn layer/Zn layer/Cu layer/Zn layer/collector. The multi-plated layer was subjected to removal of pigment ink, washing with water, and heat treatment in the same way as in Example 1, whereby Cu, Zn, and Sn were alloyed to form an active material layer. During the heat treatment, Zn between the Sn layer and the Cu layer formed a solid solution in the formed intermetallic compound, and Zn between the Cu layer and the collector remained between the intermetallic compound and the collector as a protective layer for the collector.

Thereafter, an electrode for a non-aqueous secondary battery was produced in the same way as in Example 1. When the surface of the electrode was observed with an electron microscope, the area the active material layer occupy on the collector was 80%.

COMPARATIVE EXAMPLE

An electrode for a non-aqueous secondary battery was produced in the same way as in Example 1, except that a Sn-plated layer was formed on the entire surface of a copper foil without a non-conductive portion. The area ratio of the active material layer in the electrode occupying on the collector was 100%.

Figure 3:
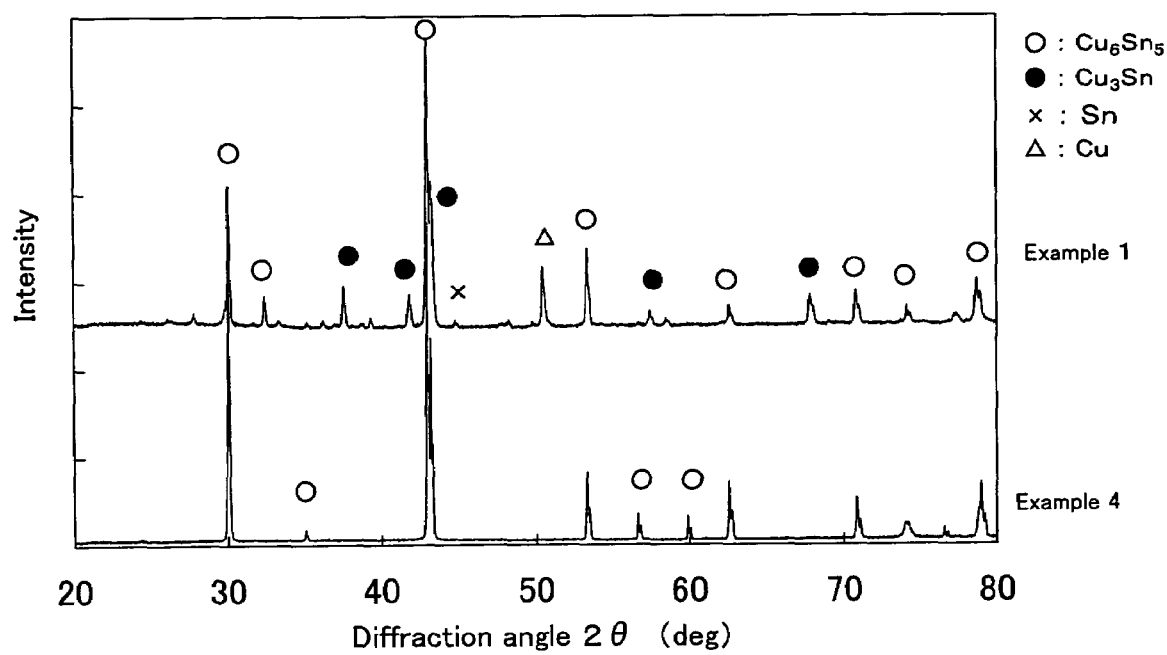
FIG. 3 shows X-ray diffraction patterns of electrodes of Examples 1 and 4 of the present invention.

In order to check a formed compound, the active material layers of the electrodes of Examples 1 to 4, and Comparative Example were subjected to X-ray diffraction measurement with a CuKα line, using an X-ray diffraction measurement apparatus "RINT2500V" (produced by Rigaku Denki Co., Ltd.). FIG. 3 shows X-ray diffraction patterns of the electrodes of Examples 1 and 4. Table 1 shows intensity ratios $I_b/I_a$ and $I_c/I_a$, assuming that the intensity of the strongest peak of a diffraction line derived from a NiAs-type intermetallic compound (compound with $Cu_6Sn_5$ or a part thereof replaced with Zn) belonging to a space group $P6_3/mmc$ is $I_a$, the intensity of the strongest peak of a diffraction line derived from Sn that is alloyed with Li is $I_b$, and the intensity of the strongest peak of a diffraction line derived from $Cu_3Sn$ is $I_c$.

TABLE 1

| | $I_b/I_a$ | $I_c/I_a$ |
|---|---|---|
| Example 1 | 0.05 | 0.16 |
| Example 2 | 0.05 | 0.16 |
| Example 3 | 0.08 | 0.18 |
| Example 4 | 0 | 0 |
| Comparative Example | 0.12 | 0.20 |

In the electrodes of Examples 1 to 3 and Comparative Example in which the collector was allowed to react with Sn, a Sn phase and a $Cu_3Sn$ phase were recognized in addition to an intended intermetallic compound. In the electrode of Example 4 in which the protective layer was provided on the collector, and only the multi-plated layer was allowed to react, the peak of a different phase was not recognized, and a single phase of an intermetallic compound capable of reversibly absorbing and desorbing Li was recognized.

Next, each of the electrodes of Examples 1 to 4, and Comparative Example was used as a negative electrode, and combined with the following positive electrode, electrolyte solution, and separator, whereby non-aqueous secondary batteries were produced, and evaluated for characteristics.

A paste containing a positive mixture was prepared by uniformly mixing 90 parts by mass of $LiCoO_2$, 6 parts by mass of carbon black, 4 parts by mass of polyvinylidene fluoride, and 40 parts by mass of N-methyl-2-pyrolidone. The paste containing a positive mixture thus obtained was applied to one surface of an aluminum foil (thickness: 20 μm) to be a collector, followed by drying, whereby a positive mixture layer of 32 mg/cm² per unit area was formed. Thereafter, the thickness of the positive mixture layer was adjusted so that the density of the positive mixture layer was 3.2 g/cm³ by calender processing. Thereafter, the electrode was punched to a circle (diameter: 15 mm) to obtain a positive electrode.

As an electrolyte solution, a mixed solvent of ethylene carbonate and methyl ethyl carbonate (volume ratio: 1:2), in which 1.2 mol/dm³ of $LiPF_6$ was dissolved, was used. As a separator, a porous polyethylene film "EMM25" (thickness: 25 μm) produced by Tonen Chemical Corp. was used.

Non-aqueous secondary batteries were assembled using the positive electrode, the electrolyte solution, and each of the negative electrodes of Examples 1 to 4, and Comparative Example. The non-aqueous secondary batteries were subjected to a charging/discharging test at room temperature (25° C.), and the following initial charging/discharging efficiency, high rate characteristics, and cycle characteristics were obtained.

(Initial Charging/Discharging Efficiency)

Setting a current density to be 0.2 mA/cm², a battery was charged to 4.3 V, and then, discharged to 3 V. Thus, a first charging capacity and a first discharging capacity were measured, and an initial charging/discharging efficiency was calculated by the following expression.

Initial charging/discharging efficiency (%)=(1st discharging capacity/1st charging capacity)×100

(High Rate Characteristics)

A battery was charged to 4.3 V at 0.2 mA/cm², and after a downtime for 10 minutes, the battery was discharged to 2.5 V. At this time, the capacity of a negative electrode was checked. Thereafter, the current densities corresponding to 0.2 C and 1.0 C with respect to the obtained capacity of a negative electrode were calculated. Then, discharging capacities were measured respectively by charging the battery for 5 hours at the current density corresponding to 0.2 C, and discharging the battery to 2.5 V at the current densities corresponding to 0.2 C and 1.0 C, and a ratio between the discharging capacities at the current densities corresponding to 0.2 C and 1.0 C was obtained as high rate characteristics.

High rate characteristics (%)=(Discharging capacity at 1.0 C/Discharging capacity at 0.2 C)×100

(Cycle Characteristics)

A charging/discharging cycle was repeated 20 times, each cycle including charging a battery to 4.3 V at a current density of 0.2 mA/cm², and discharging the battery to 3 V, and cycle characteristics were calculated by the following expression.

Cycle characteristics (%)=(20th discharging capacity/1st discharging capacity)×100

Furthermore, by the method described below, the degree of strain in the charging/discharging cycle of the electrodes of Examples 1 to 4, and Comparative Example was checked.

A cell for measuring strain was assembled as follows. As a positive electrode, an electrode having, on a collector, a positive mixture layer containing 92% by mass of $LiCoO_2$, 4% by mass of carbon black, and 4% by mass of polyvinylidene fluoride was used. As a negative electrode, each of the electrodes of Examples 1 to 4, and Comparative Example was used. The positive electrode and the negative electrode were combined via the above-mentioned separator "EMM25" so that the capacity ratio (capacity of the positive electrode/capacity of the negative electrode) was 1.0 or more. The combined positive electrode and the negative electrode were sealed in an contained made of an aluminum laminated film to obtain a cell for measurement. Before assembling the cell, the thickness of the negative electrode was previously measured with a micrometer, and used for the following calculation as the thickness of the negative electrode before charging.

The cell for measurement was charged to 4.3 V at a current density of 0.2 mA/cm², and a change in cell thickness before and after charging was measured with a micrometer. Assuming that the thickness of the positive electrode is not changed before and after charging, and a change in cell thickness is caused by the strain of the negative electrode, the degree of strain of the negative electrode was obtained by the following expression.

Strain of negative electrode=[(Cell thickness after charging)−(Cell thickness before charging)]/Thickness of negative electrode before charging Table 2 shows measured values of the above-mentioned initial charging/discharging efficiency, charging capacity at 0.2 C, high rate characteristics, cycle characteristics, and strain of the negative electrode. The discharging capacity was shown as a value per unit mass of an active material layer.

TABLE 2

|  | Initial charging/ discharging efficiency | Discharging capacity at 0.2 C (mAh/g) | High rate characteristics (%) | Cycle characteristics (%) | Strain of negative electrode |
|---|---|---|---|---|---|
| Example 1 | 90 | 900 | 91 | 92 | 4 |
| Example 2 | 85 | 890 | 90 | 91 | 5 |
| Example 3 | 80 | 860 | 85 | 88 | 7 |
| Example 4 | 88 | 940 | 92 | 94 | 2.8 |
| Comparative Example | 68 | 705 | 50 | 70 | 15 |

As shown in Table 2, the electrodes of Examples 1 to 4 had a higher charging/discharging efficiency, a larger discharging capacity, more excellent high rate characteristics, and more excellent cycle characteristics with less decrease in charging capacity in a charging/discharging cycle, compared with the electrode of Comparative Example. Furthermore, in the case where the strain of the negative electrode during charging was small, and a container made of a laminated film that is likely to be deformed was used, the battery was suppressed from expanding. This is considered to contribute to the enhancement of the above-mentioned cycle characteristics. In particular, the electrode of Example 4 in which the protective layer is formed between the collector and the active material layer had most excellent cycle characteristics with less strain due to the suppression of a reaction between the collector and the active material layer.

As described above, the present invention solves the above-mentioned problems of the prior art, and can provide an electrode capable of contributing to the enhancement of the capacity and the cycle characteristics of a non-aqueous secondary battery and also capable of enhancing the high rate characteristics. Furthermore, by configuring a battery, using the electrode as a negative electrode, a non-aqueous secondary battery can be provided, which has a large capacity, and is excellent in cycle characteristics and high rate characteristics, and in which the thickness of the battery is changed less during charging.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An electrode for a non-aqueous secondary battery comprising an alloy containing metal that is alloyed with Li and metal that is not alloyed with Li on a collector made of a material that is not alloyed with Li,
wherein the alloy is formed on the collector as a plurality of convex portions regularly partitioned with gaps disposed between the convex portions, and contains an intermetallic compound of the metal that is alloyed with Li and the metal that is not alloyed with Li, capable of repeatedly absorbing and desorbing Li,
an area the convex portions occupy on the collector is 60 to 90% of an area of the collector, and
wherein a protective layer is formed between the collector and the convex portions.

2. The electrode for a non-aqueous secondary battery according to claim 1, wherein the metal that is alloyed with Li is at least one kind selected from the group consisting of Sn, Si, Ge, Sb, In, Al, and Pb.

3. The electrode for a non-aqueous secondary battery according to claim 1, wherein the metal that is not alloyed with Li is at least one kind selected from the group consisting of Cu, Ni, Fe, Mn, Co, Cr, Mo, W, Ti, and Zr.

4. The electrode for a non-aqueous secondary battery according to claim 1, wherein a material constituting the collector is at least one kind selected from the group consisting of Cu, Ni, Fe, a Cu alloy, stainless steel, a combination thereof and a layered body comprising at least two of Cu, Ni, Fe, a Cu alloy, and stainless steel.

5. The electrode for a non-aqueous secondary battery according to claim 1, wherein, in an X-ray diffraction measurement of the alloy with a CuKα line, assuming that intensities of strongest peaks of diffraction lines derived from the intermetallic compound and the metal that is alloyed with Li are $I_a$ and $I_b$, respectively, an intensity ratio $I_b/I_a$ is 0.1 or less.

6. The electrode for a non-aqueous secondary battery according to claim 1, wherein the intermetallic compound is a NiAs-type intermetallic compound belonging to a space group $P6_3/mmc$.

7. The electrode for a non-aqueous secondary battery according to claim 6, wherein the intermetallic compound is $Cu_6Sn_5$ or a compound obtained by replacing a part of an element of $Cu_6Sn_5$ with at least one kind of element selected from the group consisting of Bi, Fe, Ni, Zn, Ag, Zr, Pb, In, and Sb.

8. The electrode for a non-aqueous secondary battery according to claim 1, wherein the intermetallic compound is formed by alloying the collector, with a plated layer containing the metal that is alloyed with Li by heat treatment.

9. The electrode for a non-aqueous secondary battery according to claim 1, wherein the intermetallic compound is formed by alloying a plated layer containing metal that is not alloyed with Li formed on the collector, with a plated layer containing metal that is alloyed with Li by heat treatment.

10. A non-aqueous secondary battery, comprising:
a positive electrode;
a negative electrode including an alloy containing metal that is alloyed with Li and metal that is not alloyed with Li on a collector made of a material that is not alloyed with Li; and
a non-aqueous electrolyte,
wherein the alloy is formed on the collector as a plurality of convex portions regularly partitioned with gaps disposed between the convex portions, and contains an intermetallic compound of the metal that is alloyed with Li and the metal that is not alloyed with Li, capable of repeatedly absorbing and desorbing Li,
an area the convex portions occupy on the collector is 60 to 90% of an area of the collector, and
wherein a protective layer is formed between the collector and the convex portions.

11. The non-aqueous secondary battery according to claim 10, wherein the metal that is alloyed with Li is at least one kind selected from the group consisting of Sn, Si, Ge, Sb, In, Al, and Pb.

12. The non-aqueous secondary battery according to claim 10, wherein the metal that is not alloyed with Li is at least one kind selected from the group consisting of Cu, Ni, Fe, Mn, Co, Cr, Mo, W, Ti, and Zr.

13. The non-aqueous secondary battery according to claim 10, wherein a material constituting the collector is at least one kind selected from the group consisting of Cu, Ni, Fe, a Cu alloy, stainless steel, a combination thereof, and a layered body comprising at least two of Cu, Ni, Fe, a Cu alloy, and stainless steel.

14. The non-aqueous secondary battery according to claim 10, wherein, in an X-ray diffraction measurement of the alloy with a CuKα line, assuming that intensities of strongest peaks of diffraction lines derived from the intermetallic compound and the metal that is alloyed with Li are $I_a$ and $I_b$, respectively, an intensity ratio $I_b/I_a$ is 0.1 or less.

15. The non-aqueous secondary battery according to claim 10, wherein the intermetallic compound is a NiAs-type intermetallic compound belonging to a space group $P6_3/mmc$.

16. The non-aqueous secondary battery according to claim 15, wherein the intermetallic compound is $Cu_6Sn_5$ or a compound obtained by replacing a part of an element of $Cu_6Sn_5$ with at least one kind of element selected from the group consisting of Bi, Fe, Ni, Zn, Ag, Zr, Pb, In, and Sb.

17. The non-aqueous secondary battery according to claim 10, wherein the intermetallic compound is formed by alloying the collector, with a plated layer containing the metal that is alloyed with Li by heat treatment.

18. The non-aqueous secondary battery according to claim 10, wherein the intermetallic compound is formed by alloying a plated layer containing metal that is not alloyed with Li formed on the collector, with a plated layer containing metal that is alloyed with Li heat treatment.

19. The electrode for a non-aqueous secondary battery according to claim 1, wherein the convex portions have a shape of a cylinder, a cone, a truncated cone, a prism, a pyramid, a truncated pyramid, or a shape similar thereto.

20. The non-aqueous secondary battery according to claim 10, wherein the convex portions have a shape of a cylinder, a cone, a truncated cone, a prism, a pyramid, a truncated pyramid, or a shape similar thereto.

* * * * *